(12) United States Patent
Katori et al.

(10) Patent No.: US 8,249,609 B2
(45) Date of Patent: Aug. 21, 2012

(54) RADIO RESOURCE ALLOCATION METHOD AND RADIO STATION

(75) Inventors: Masato Katori, Kawasaki (JP); Makoto Ueno, Kawasaki (JP); Hideyuki Yahata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 380 days.

(21) Appl. No.: 12/569,326

(22) Filed: Sep. 29, 2009

(65) Prior Publication Data
US 2010/0015987 A1 Jan. 21, 2010

Related U.S. Application Data

(63) Continuation of application No. PCT/JP2007/057241, filed on Mar. 30, 2007.

(51) Int. Cl.
*H04W 72/00* (2009.01)
(52) U.S. Cl. ............ 455/450; 455/452.1; 370/329; 370/330; 370/337; 370/344
(58) Field of Classification Search .......... 455/450, 455/452.1; 370/329, 330, 337, 344
See application file for complete search history.

(56) References Cited

U.S. PATENT DOCUMENTS
2006/0084445 A1  4/2006  Minami et al.
2007/0211757 A1*  9/2007  Oyman .................. 370/468

FOREIGN PATENT DOCUMENTS
| EP | 1865733 | 12/2007 |
|---|---|---|
| JP | 02-097137 | 4/1990 |
| JP | 10126846 | 5/1998 |
| JP | 2006115291 | 4/2006 |
| WO | 2006109439 | 10/2006 |

OTHER PUBLICATIONS

International Search Report dated Aug. 14, 2007.
IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Band and Corrigendum IEEE Std 802.16e-2005 and IEEE Std 802.16/2004/Cor1-2005.

* cited by examiner

*Primary Examiner* — Amancio Gonzalez
(74) *Attorney, Agent, or Firm* — Murphy & King, P.C.

(57) ABSTRACT

Provided is a radio resource allocation method of allocating common radio resources shared among a plurality of radio stations or a plurality of sectors to each of the plurality of radio stations or each of the plurality of sectors. The method includes defining, as a frame set, a given number of radio frames for repeatedly providing the common radio resources along a time axis, defining, as radio resource units, minimum units obtained by dividing the common radio resources provided by the frame set in units of the radio frames and in units of sub-channel groups, and allocating at least one of the radio resource units to each of the plurality of radio stations or the each of the plurality of sectors.

10 Claims, 16 Drawing Sheets

FIG. 5
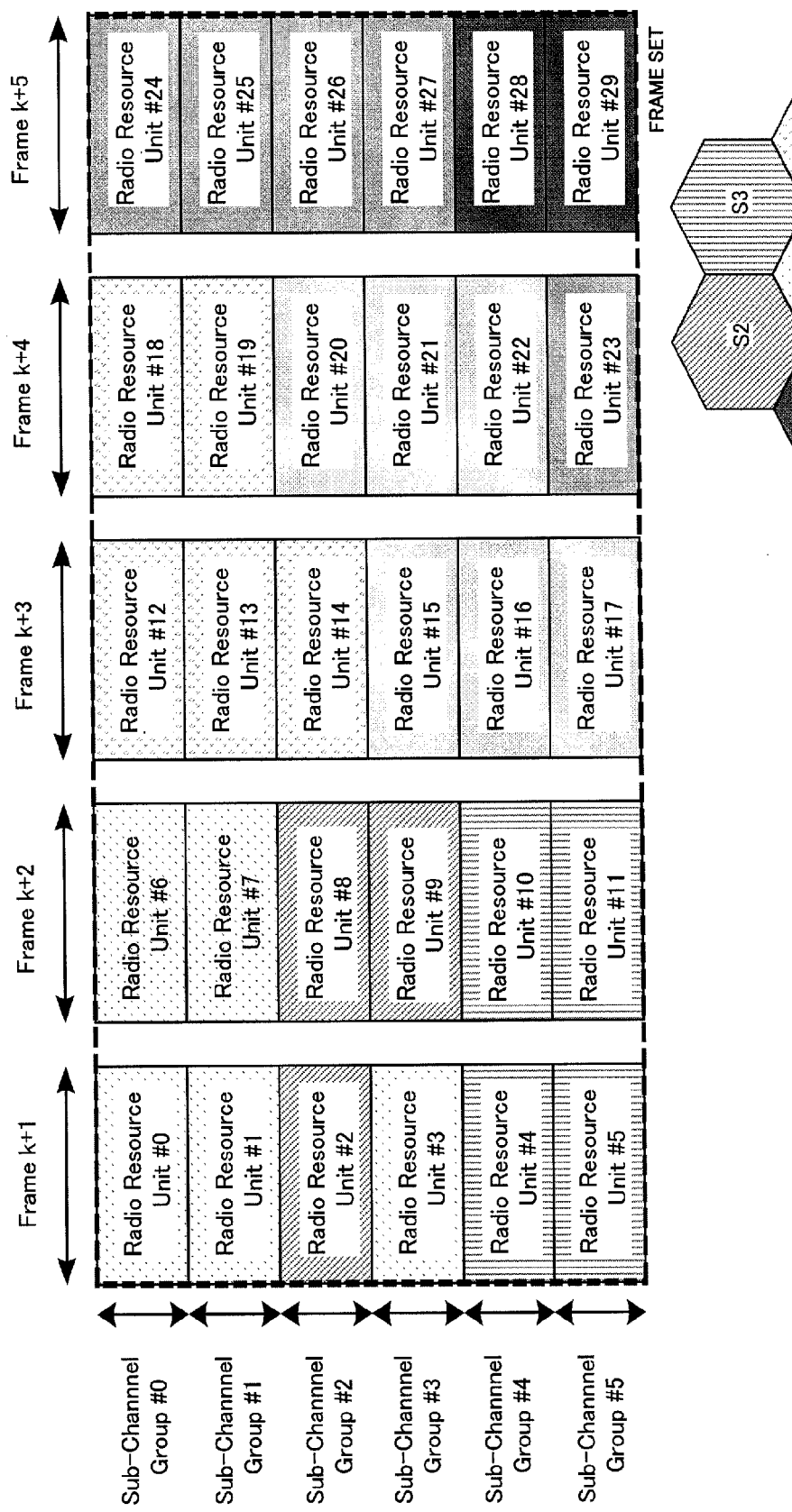
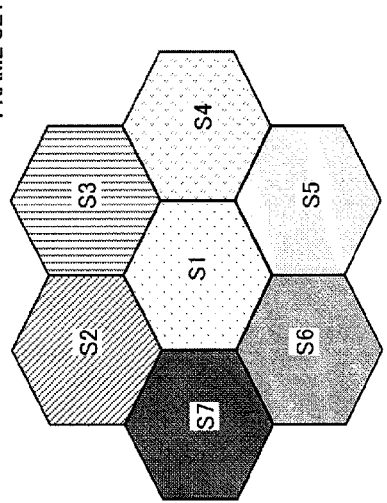

FIG. 10

RADIO RESOURCE USE STATUS MANAGEMENT TABLE /21

| OWN STATION INFORMATION |
|---|
| BASE STATION NUMBER: #0<br>THE NUMBER OF RADIO RESOURCE UNITS<br>  RADIO RESOURCE NUMBER [#0]<br>  RADIO RESOURCE NUMBER [#1]<br>  RADIO RESOURCE NUMBER [#2] |
| SURROUNDING BASE STATION INFORMATION [0] |
| BASE STATION NUMBER: #1<br>THE NUMBER OF RADIO RESOURCE UNITS<br>  RADIO RESOURCE NUMBER [#3]<br>  RADIO RESOURCE NUMBER [#4]<br>  RADIO RESOURCE NUMBER [#5] |
| SURROUNDING BASE STATION INFORMATION [1] |
| BASE STATION NUMBER: #2<br>THE NUMBER OF RADIO RESOURCE UNITS<br>  RADIO RESOURCE NUMBER [#6]<br>  RADIO RESOURCE NUMBER [#7]<br>  RADIO RESOURCE NUMBER [#8] |
| SURROUNDING BASE STATION INFORMATION [2] |
| BASE STATION NUMBER: #3<br>THE NUMBER OF RADIO RESOURCE UNITS<br>  RADIO RESOURCE NUMBER [#9]<br>  RADIO RESOURCE NUMBER [#10]<br>  RADIO RESOURCE NUMBER [#11] |

FIG. 15

RADIO RESOURCE USE STATUS REPORT

| OWN STATION NUMBER | RADIO RESOURCE USE RATIO |
|---|---|

FIG. 16

RADIO RESOURCE REQUEST

| OWN STATION NUMBER | THE NUMBER OF REQUEST RADIO RESOURCE UNITS | REQUEST RADIO RESOURCE UNIT NUMBER |
|---|---|---|

FIG. 17

RADIO RESOURCE USE CHANGE REPORT (RADIO
RESOURCE USE CHANGE NOTIFICATION)

| OWN STATION NUMBER | THE NUMBER OF USED RADIO RESOURCE UNITS | USED RADIO RESOURCE UNIT NUMBER |
|---|---|---|

RADIO RESOURCE ALLOCATION METHOD AND RADIO STATION

CROSS-REFERENCE TO RELATED APPLICATION

This is a continuation of Application PCT/JP2007/057241, filed on Mar. 30, 2007, now pending, the entire contents of which are herein wholly incorporated by reference.

FIELD

The present invention relates to a radio resource allocation method and a radio station.

BACKGROUND ART

FIG. 1 illustrates a radio frame format (using partial usage of sub-channel (PUSC) scheme) of worldwide interoperability for microwave access (WiMAX) standard specifications defined by the IEEE 802.16e, which is a related art.

In the format illustrated in FIG. 1, sub-channels (the number of sub-channels is 60, and the bandwidth is 20 MHz) of an orthogonal frequency division multiplexing access (OFDMA) system are divided into six sub-channel groups #0 to #5, and radio resources are distributed to sectors accommodated by a base station.

For example, as illustrated in FIG. 1, in a case where the base station includes three sectors S1 to S3, the radio resources of the sub-channel groups #0 and #1 are allocated to the sector S1, the radio resources of the groups #2 and #3 are allocated to the sector S2, and the radio resources of the groups #4 and #5 are allocated to the sector S3.

In such a frame format, a structure (layout position) of a terminal broadcast information area such as a frame control header (FCH) or a downlink/uplink-MAP (DL/UL-MAP) is fixed to sub-channel groups (#0, #2, and #4) having even numbers. Accordingly, one radio resource cannot be divided into three or more sectors.

Further, in a case where the communication area of a base station is divided into three sectors, in order to prevent interference, another base station located in the vicinity of the base station cannot be allocated with frequencies in the same band.

Further, as a radio resource allocation method, it is conceivable to employ fixed radio resource allocation in which, with respect to a base station including a plurality of sectors, the radio resources are equally allocated in a fixed manner among all the sectors. For example, as illustrated in FIG. 2, when the radio resources are equally allocated in a fixed manner to sectors 1 to 3, there may occur a case in which, at a certain time point, the number of users accommodated in the sector 1 is small, the number of users accommodated in the sector 2 is large, and the number of users accommodated in the sector 3 is moderate. In this case, such a situation may occur in which the radio resources of the sector 1 have an unused part left whereas the sector 2 runs short of radio resources. As described above, with the fixed radio resource allocation, it is impossible for the base station as a whole to attain a maximum throughput when users (terminals) concentrate on a particular sector among a plurality of sectors.

On the other hand, in dynamic radio resource allocation, a ratio of the radio resources to be allocated to each sector with respect to all the radio resources is dynamically changed in accordance with the number of users accommodated in each sector. In the dynamic radio resource allocation, under the above-mentioned situation, it is possible to reduce the ratio of the radio resources to be allocated to the sector 1 while increasing the ratio of the radio resources to be allocated to the sector 2. With this configuration, even when the number of accommodated users is disproportionately large in a particular sector, it is possible to attain a maximum throughput in the base station as a whole, and hence efficient utilization of frequency bands can be achieved.

FIG. 3 is an explanatory diagram for a case in which a reuse factor of 1 (Reuse Factor=1) is realized by using dynamic channel allocation control as a related art. In the case of the reuse factor of 1 with the use of this dynamic channel allocation control, the same frequency band is used among base stations (sectors), and, in accordance with the use status of the radio resources of each of the base stations, the radio resources are dynamically allocated to the respective base stations (in FIG. 3, base stations S1 to S6) in units of sub-channels. Specifically, the use status of the radio resources is checked (measured) at fixed intervals for each base station, whereby radio resource distribution to each base station (the number of sub-channels to be allocated to each base station (sector)) is dynamically changed.

Patent Document 1: JP 10-126846 A

However, the related art illustrated in FIG. 2 (the case of the Reuse Factor=1 with the use of the dynamic channel allocation control) has the following problems.

<1> The structures inside radio frames need to be made identical among the base stations. This prevents the individual base stations from flexibly operating a technology that utilizes a plurality of antennas, such as multiple-input multiple-output (MIMO) or an adaptive array system (AAS).

<2> When the sub-channels are used randomly among a plurality of base stations (sectors), it becomes difficult to take measures against partial fading or the like.

<3> The radio resources are divided into small segments, leading to decreased efficiency in operation.

SUMMARY

According to a first aspect of the present invention, there is provided a radio resource allocation method of allocating common radio resources shared among a plurality of radio stations or a plurality of sectors to each of the plurality of radio stations or each of the plurality of sectors, including:

defining, as a frame set, a plurality of radio frames in a given number for repeatedly providing the common radio resources along a time axis;

defining, as radio resource units, minimum units obtained by dividing the common radio resources provided by the frame set in units of the radio frames and in units of sub-channel groups; and allocating at least one of the radio resource units to each of the plurality of radio stations or the each of the plurality of sectors.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram illustrating an example of radio resource unit allocation with respect to a plurality of base stations (sectors);

FIG. 10 is a diagram illustrating an example of a radio resource use status management table managed by a radio resource controller (RRC);

FIG. 15 is a diagram illustrating a format example of a radio resource use status report message;

FIG. 16 is a diagram illustrating a format example of a radio resource request message; and FIG. 17 is a diagram illustrating a format example of a radio resource use change report and a radio resource use change notification message.

DESCRIPTION OF EMBODIMENTS

Figure 1:
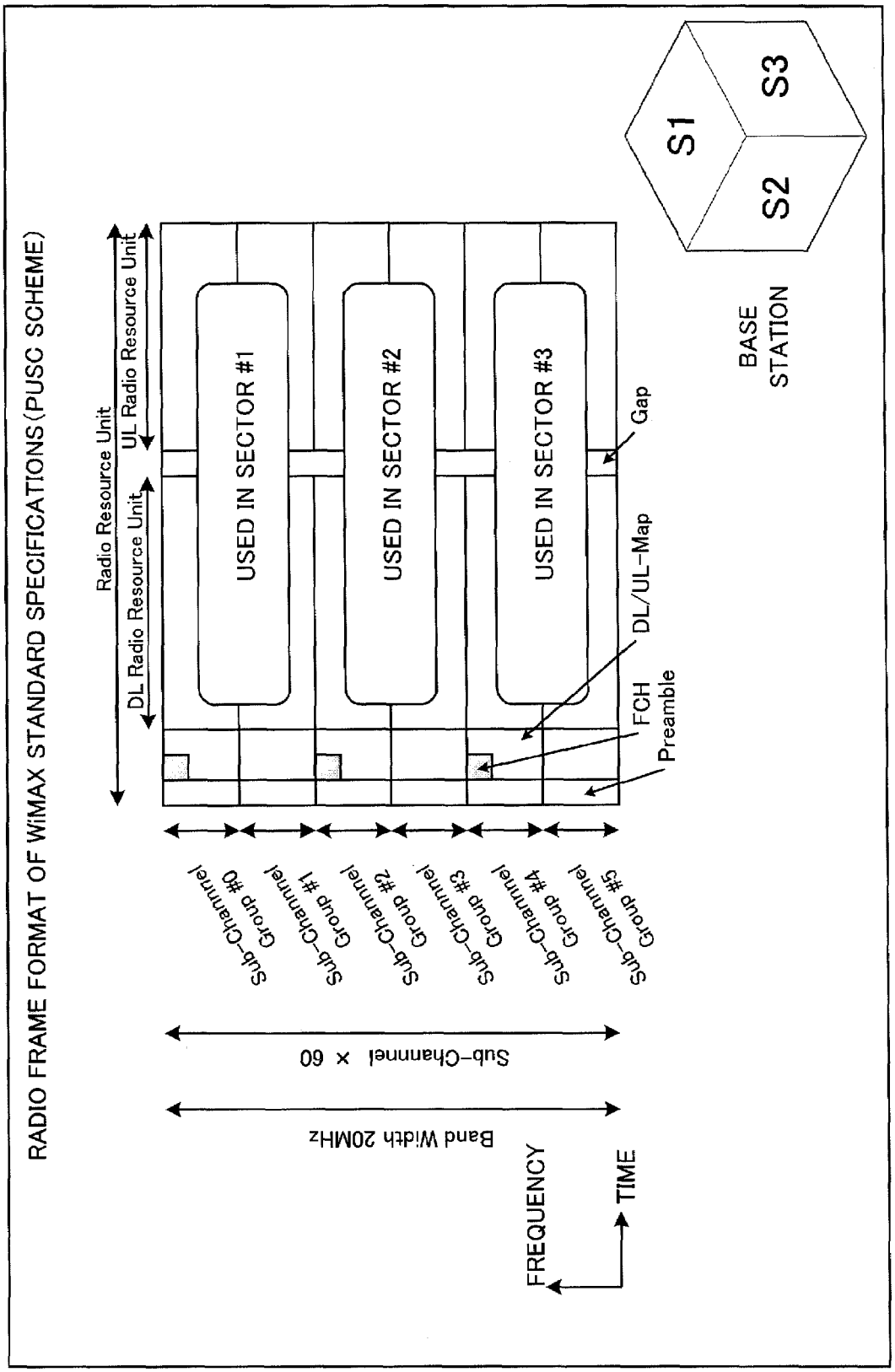
FIG. 1 is an explanatory diagram of a radio frame format (using PUSC scheme) of WiMAX standard specifications.
Figure 2:
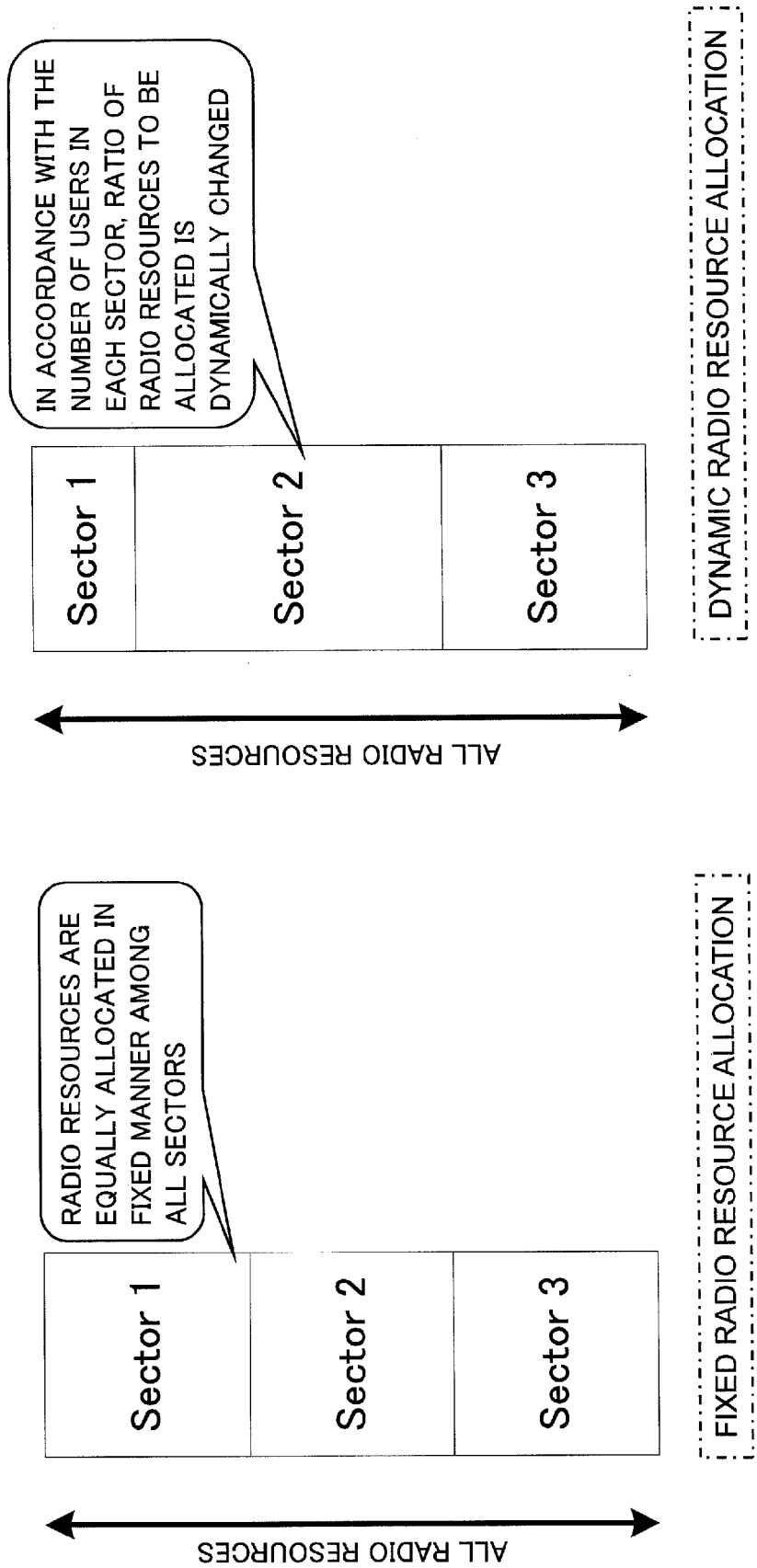
FIG. 2 is an explanatory diagram of fixed radio resource allocation and dynamic radio resource allocation.
Figure 3:
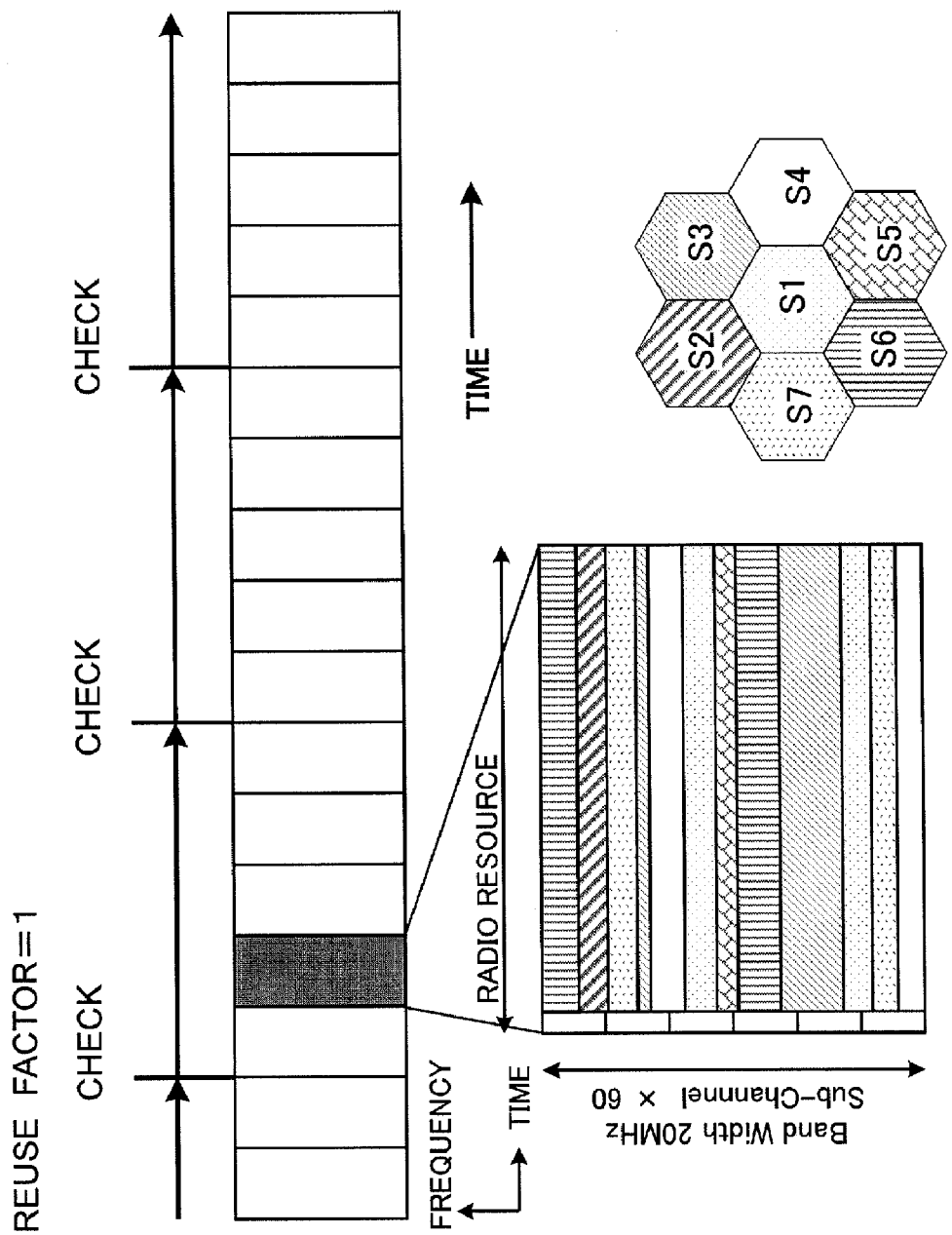
FIG. 3 is an explanatory diagram of a conventional technology in which, by using the same frequency band repeatedly (Reuse Factor=1), sub-channels are dynamically allocated to a plurality of base stations (sectors)

Hereinbelow, with reference to the drawings, description is made of an embodiment of the present invention. A configuration of the embodiment is illustrated by way of example, and the present invention is not limited to the configuration of the embodiment.

<Outline of Embodiment>

In the embodiment of the present invention, there are provided a method and a device relating to dynamic radio resource allocation control in which radio wave resources (radio resources) are used at maximum efficiency in mobile wireless communication that adopts an OFDMA system.

The embodiment of the present invention enables efficient radio resource allocation with the adoption or provision of at least one of the following (1) to (4), and hence enables each base station or sector to achieve a "maximum number of accommodated terminals" and a "maximum throughput" in an allocated frequency band.

(1) Repeated utilization of the same frequency (Reuse Factor=1) under a PUSC scheme is adopted to a plurality of neighboring base stations (sectors) in a mobile wireless communication network adopting an OFDMA system.

(2) Function of dynamically allocating in units of radio resource units, at a base station, radio resources (frequency bands) allocated to an operator (3) Function of using, in a fixed band, radio resource units obtained through distribution of radio resources (4) Function of enabling the adoption of MIMO or an adaptive array system (AAS), which is used for allocation, to be carried out flexibly in each base station <Preconditions>

As the preconditions for realizing the embodiment of the present invention (dynamic radio resource allocation control that combines TDMA and OFDMA), it is necessary to have the following items (1) to (5) identical for all radio base stations/all sectors:

(1) timing synchronization of radio frames;
(2) size of radio frames;
(3) PermBase (information and format necessary for mapping physical sub-carriers onto logical channels in the PUSC scheme);
(4) bandwidth; and
(5) fast Fourier transform (FFT) size.

<Definition of Radio Resource Units>

First, description is made of a definition of radio resource units obtained by dividing the radio resources in units of sub-channel groups and in units of radio frames.

In the dynamic radio resource allocation control according to the embodiment of the present invention, common radio resources shared among a plurality of radio stations (for example, base stations) or a plurality of sectors are allocated to the respective radio stations or the respective sectors.

In the embodiment of the present invention, the time axis is divided by a plurality of radio frames in a given number, and radio resources provided by using the plurality of radio frames in the given number are defined as the common radio resources that are shared among the plurality of radio stations or the plurality of sectors. Those common radio resources are referred to as a "radio frame set (frame set)". In the embodiment of the present invention, this frame set is repeatedly provided to the plurality of radio stations or the plurality of sectors along the time axis.

The frame set is further divided along the frequency axis. As a radio frame constituting the frame set, there is employed such a radio frame in which a given bandwidth can be divided into a plurality of sub-channel groups (each of the groups includes a given number of sub-channels) along the frequency axis.

The frequency axis is divided in units of the sub-channel groups. Accordingly, the frame set (common radio resources) is divided in units of the radio frames and in units of the sub-channel groups. Minimum units for the radio resources, which are generated through such division, are referred to as "radio resource units". The radio resources are allocated to each radio station and each sector in units of the radio resource units.

Figure 4:
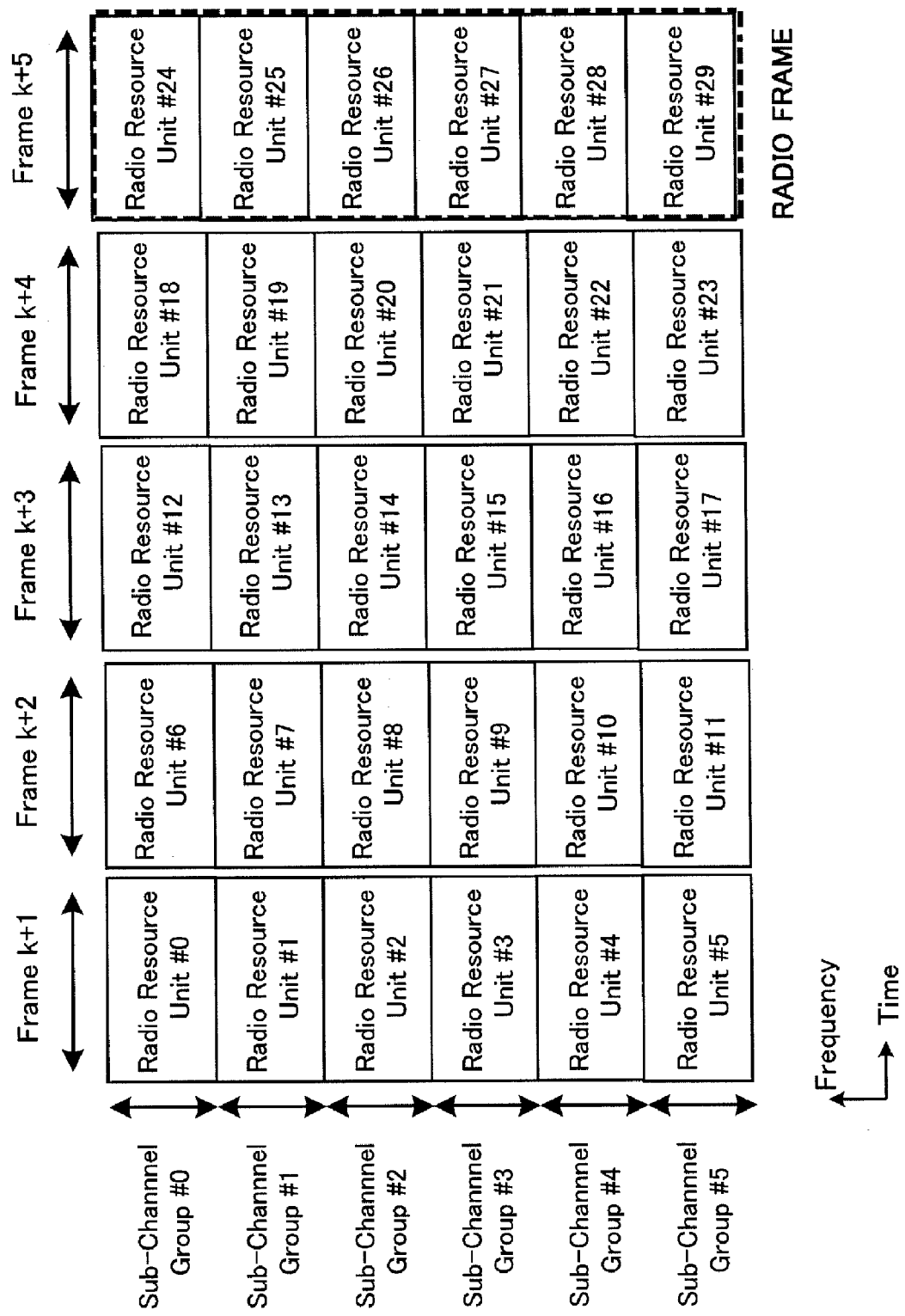
FIG. 4 is a diagram illustrating a definition example of a control radio frame set and radio resource units, which are used for allocation control according to the present invention.

FIG. 4 is an explanatory diagram of a definition of the radio frame set. The lateral direction of FIG. 4 represents the time axis along which the radio frames are illustrated, whereas the longitudinal direction represents the frequency axis along which the sub-channels (sub-channel groups) are illustrated.

In the example illustrated in FIG. 4, the number of radio frames constituting one frame set is defined as "5". Accordingly, radio frames "k+1" to "k+5" constitute one frame set.

Within the frame set, each of the radio frames is divided into an arbitrary number of sub-channel groups. Here, in the example of FIG. 4, in compliance with a radio frame format (IEEE 802.16e, PUSC: FIG. 1) of the WiMAX standard specifications, 60 sub-channels are divided into 6 sub-channel groups.

In the example illustrated in FIG. 4, an area surrounded by the broken lines constitutes one radio frame, and the radio frame is divided into 6 sub-channel groups. Accordingly, one frame set is defined by 30 radio resource units (RRU, #0 to #29) (the number of sub-channel groups (6)×the number of radio frames (5)=30 radio resource units). The radio resource units to be allocated to the respective radio stations or the respective sectors may be configured to be variable with the use of system parameters.

<Distribution of Radio Resources>

Next, description is made of the distribution of the radio resources. The radio resources are allocated, in units of the radio resource units, to a plurality of base stations or sectors to which the common radio resources are to be allocated. Specifically, each base station or each sector is allocated with at least one radio resource unit within one frame set defined by "the number of radio frames×the number of sub-channel groups".

FIG. 5 is a diagram illustrating an example of radio resource unit allocation to a plurality of base stations (sectors), in which one frame set as illustrated in FIG. 4 is allocated among a plurality of base stations S1 to S7. The lower part of FIG. 5 illustrates a layout example of cells of the base stations S1 to S7.

In the example illustrated in FIG. 5, of one frame set, at least one radio resource unit is allocated to the base stations S1 to S7. The number of radio resource units to be allocated to each of the base stations (sectors) is determined based on a usage of the radio resources at each base station (sector).

<Allocation of Radio Resource Units>

Based on the usage of the radio resources used by the base station or the sector, the number of radio resource units within one frame set to be allocated to each of the base stations or the sectors is determined in proportion to the usage thereof. In this case, as the usage of the radio resources becomes larger, the number of radio resource units to be allocated increases.

Further, the frame set serves as one unit for repeating radio resource allocation control with respect to a plurality of base stations (sectors) to which radio resources are to be allocated. Wireless communication at each base station (sector) is carried out by using radio resources (one or more radio resource units) allocated from each frame set.

Accordingly, there is a case in which, during a certain scheduling interval, a base station that is not allocated with any radio resource unit does not emit a radio wave excluding a preamble signal (synchronous signal). For example, during a scheduling interval of the frame k+1 illustrated in FIG. 5, the base stations S1, S2, and S3 emit a radio wave, but the base stations S4, S5, and S6 do not emit a radio wave. However, a preamble signal (synchronous signal) is emitted, and hence synchronization between a terminal and a base station does not become lost.

It should be noted that, in a case of distributing the radio resources to each base station or sector by using the radio frame format of the WiMAX standard specifications, a radio resource unit whose radio resource unit number is an even number has to be always contained among the radio resource units to be allocated to each base station or sector. This is because, according to the standard specifications, a radio resource unit having an even number contains a frame control header (FCH), and the FCH contains location information of the DL/UL-MAP located in the radio frame, and also contains description concerning a sub-channel group to be used.

<Distribution Change of Radio Resources>

Next, description is made of distribution change (allocation change) of the radio resources. The distribution of the radio resources with respect to a plurality of base stations or sectors is periodically and dynamically changed in accordance with a use ratio of the radio resources at each base station or sector.

Figure 6:
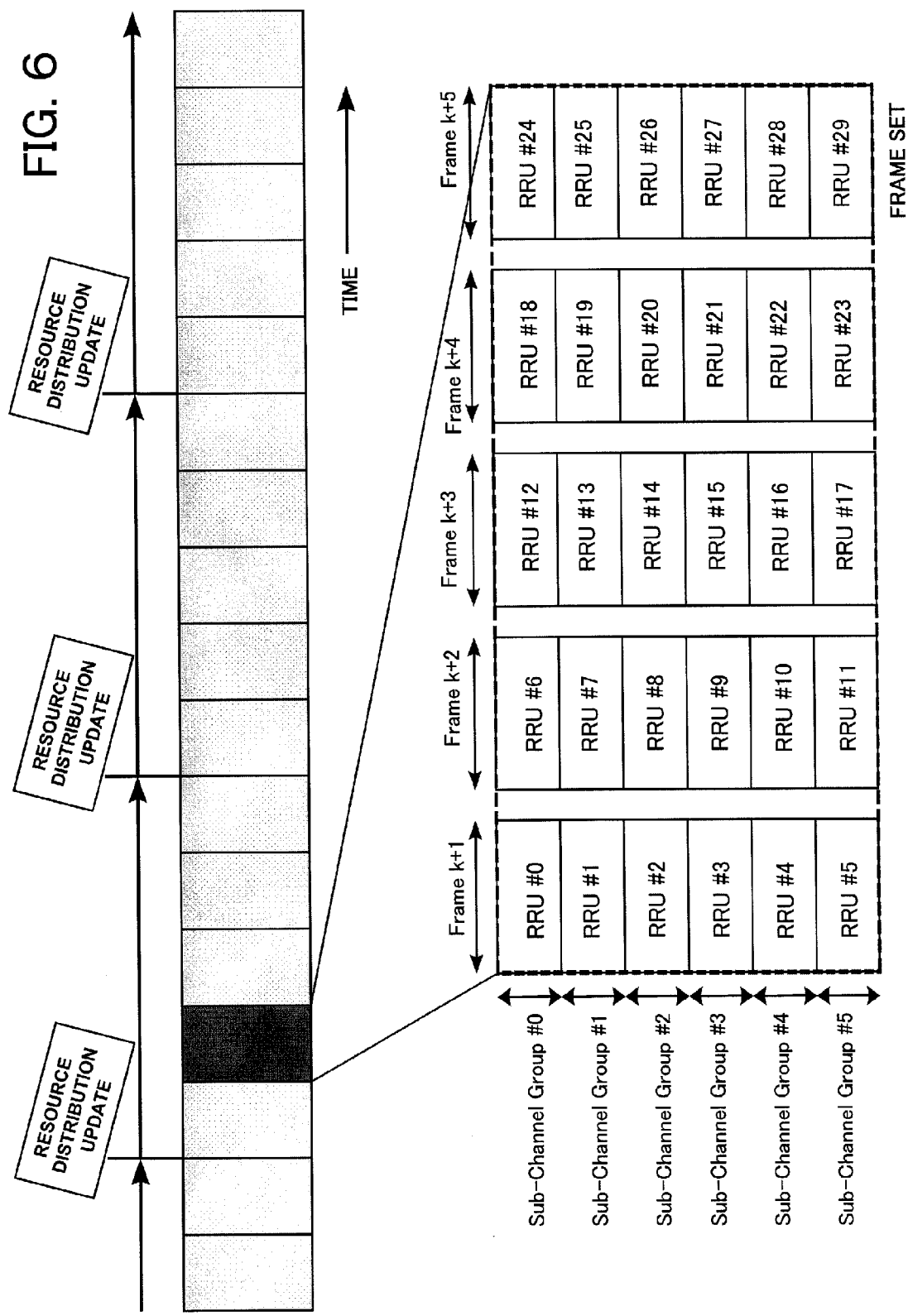
FIG. 6 is an explanatory diagram illustrating an example of processing of updating radio resource distribution.

FIG. 6 is an explanatory diagram of the distribution change of the radio resources. In the dynamic radio resource unit allocation control according to the present invention, the distribution of the radio resources is dynamically changed every time a fixed period has elapsed. For example, every time the number of provided frame sets (repetition units) has become a given number, an allocation status of the radio resource units among the common radio resources is dynamically changed (updated).

In the example illustrated in FIG. 6, the radio resource distribution is updated for every five frame sets. In other words, once radio resource distribution is determined, a frame set distributed through that radio resource distribution is repeatedly distributed five times. The interval for distribution update may be determined arbitrarily in units of the frame sets. In other words, the radio resource distribution may be updated (changed) by an arbitrary number of frame sets.

As described above, by carrying out the radio resource unit allocation control at fixed intervals, it is possible to dynamically perform allocation for each base station in accordance with change in use status of the radio resources.

<Configuration Example of Network System>

Figure 7:
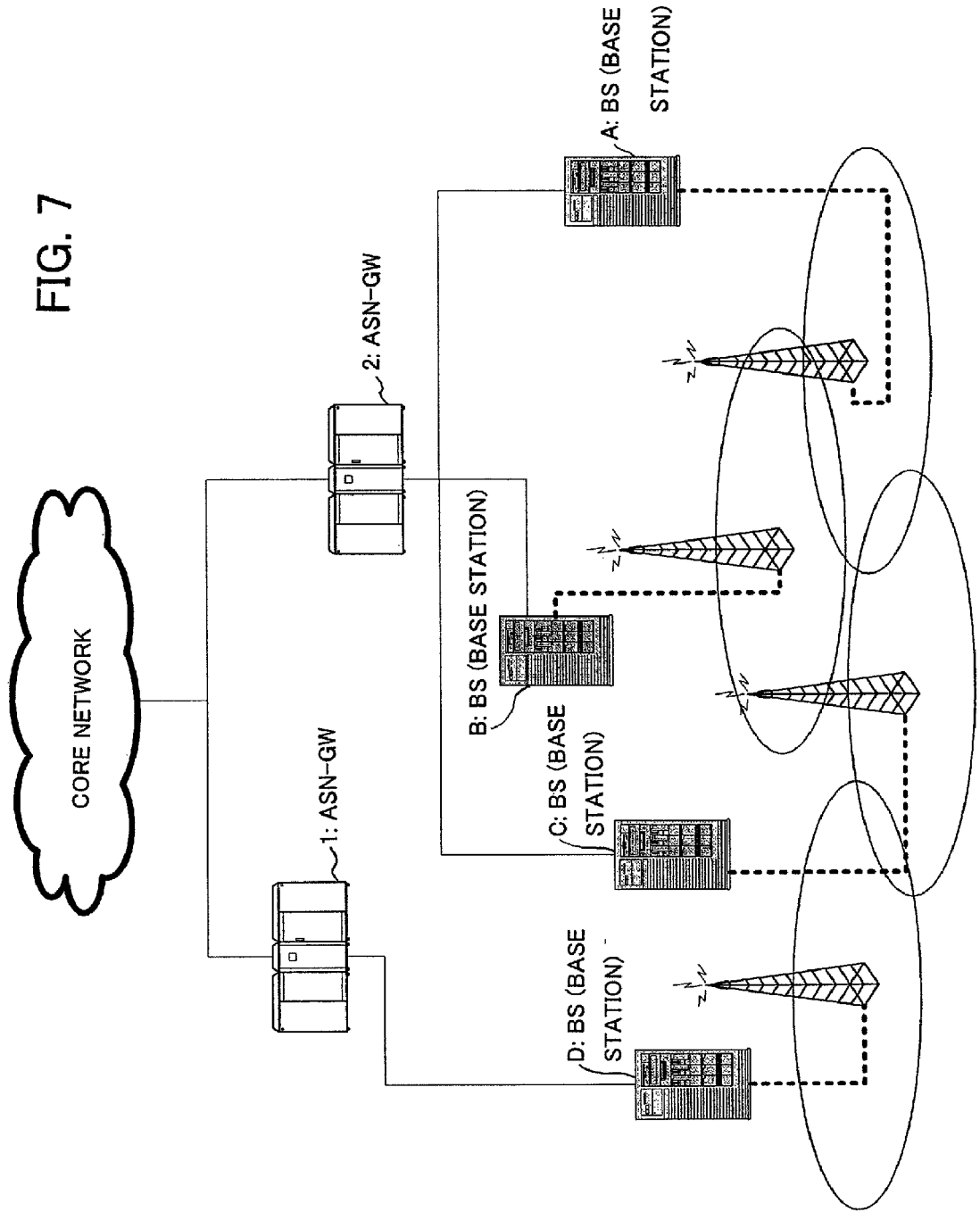
FIG. 7 is a diagram illustrating a configuration example of a network system to which the allocation control according to the present invention is applied.

FIG. 7 is a diagram illustrating a configuration example of a network system to which the above-mentioned dynamic allocation control of the radio resources is applied. FIG. 7 illustrates a network system to which WiMAX is applied. The network system includes a plurality of radio base stations (BSs) A to D each having a communication area (cell), access service network gateways (ASN-GWs) 1 and 2 that accommodates the base stations A to D, and a core network for accommodating the ASN-GWs 1 and 2.

Each of the ASN-GWs 1 and 2 is a base station management device that provides a function of controlling handover and the like between the base stations, which is necessary in WiMAX. Each of the base stations A to D uses the radio resources allocated thereto, and performs wireless communication with a terminal (accommodated user) located within a cell thereof.

In the example illustrated in FIG. 7, the cells of the base stations B and C are located adjacent to the cell of the base station A. Further, the cell of the base station D is located adjacent to the cell of the base station C. Among the base stations having the communication areas adjacent to each other as described above, the allocation control of the radio resources is carried out. Further, the embodiment of the present invention is also applicable to a case in which, when one base station has a plurality of sectors (up to three sectors), the allocation of the radio resources among the sectors is dynamically changed.

<Configuration Example of Base Station>

Figure 8:
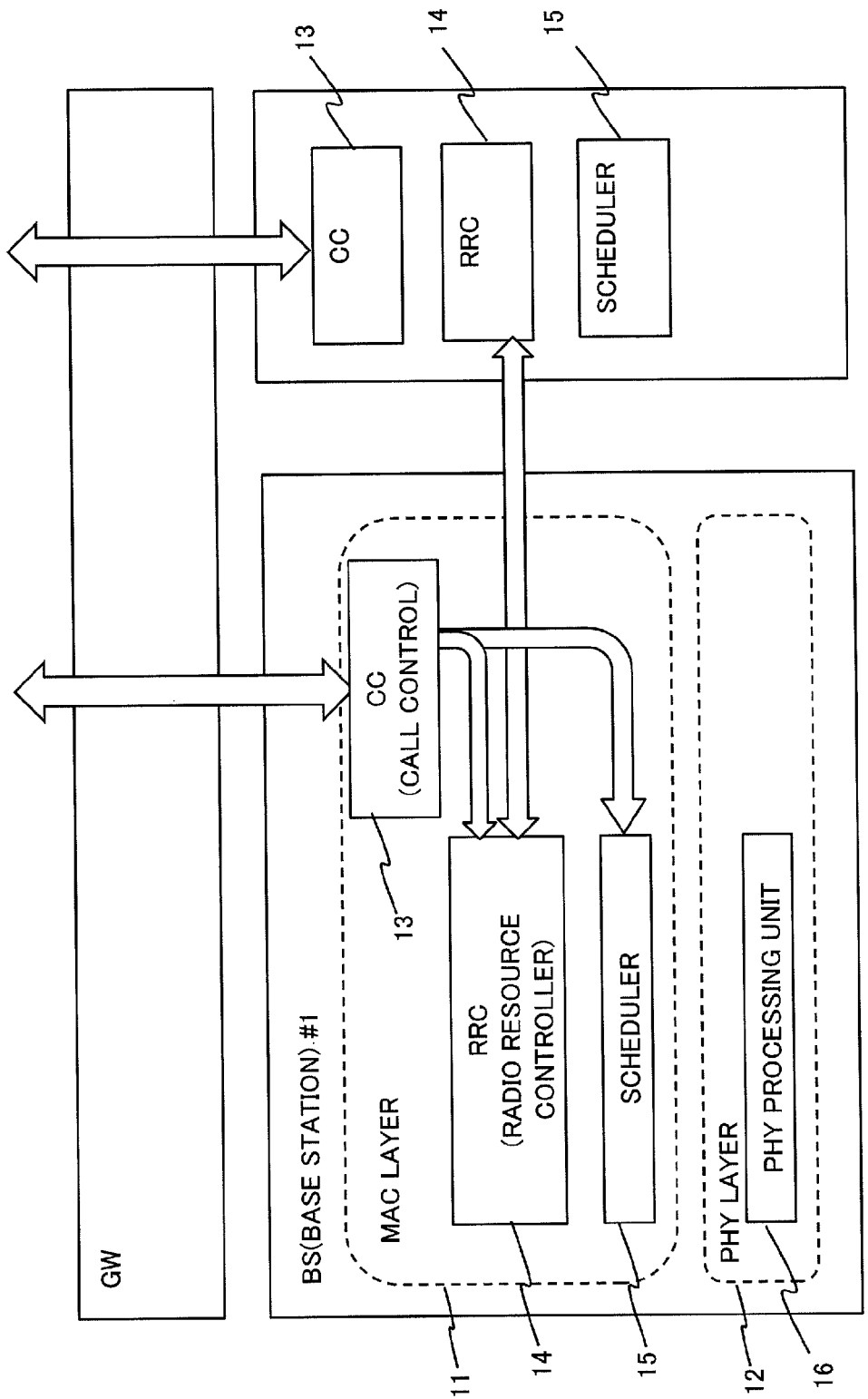
FIG. 8 is a functional block diagram illustrating a configuration example of the base station (BS) illustrated in FIG. 7.

FIG. 8 is functional blocks illustrating a configuration example of a base station, which is applicable to the base stations A to D illustrated in FIG. 7. In FIG. 8, a base station (BS) #1 is accommodated by the ASN-GW (GW) along with a base station #2. The base station #1 includes a control unit 11 for a media access control (MAC) layer and a control unit 12 for a physical (PHY) layer.

The control unit 11 includes a call controller (CC) 13, a radio resource controller (RRC) 14, and a scheduler 15. The CC 13 is responsible for call control of communication between terminals performed via the base station #1, and performs connection control concerning a call, MAC message transmission/reception control, terminal management, and the like.

The RRC 14 is a functional block for allocating, restructuring, and releasing the radio resources, and is standardized by the WiMAX standardization forum. The RRC 14 performs radio resource management and control among the base stations, radio resource management and control among the sectors within a base station (in a case where the cell is divided into a plurality of sectors), band control (reception control), and the like. The RRC 14 performs inter-RRC message communication with another base station (BS #2), and controls the dynamic radio resource allocation.

The scheduler 15 performs scheduling for transmission of data (transmission data) in order to perform communication with each terminal (normally, a plurality of terminals) accommodated by the base station by using the radio resources that have been allocated in accordance with a result of the radio resource allocation control performed by the RRC 14.

The control unit 12 for a PHY layer includes a PHY processing unit, and performs processing of subjecting the transmission data to OFDMA conversion and processing of generating a radio frame. The radio frame is transmitted from an antenna (see FIG. 7) connected to the base station.

<Procedures of Changing Radio Resource Unit Allocation>

Figure 9:
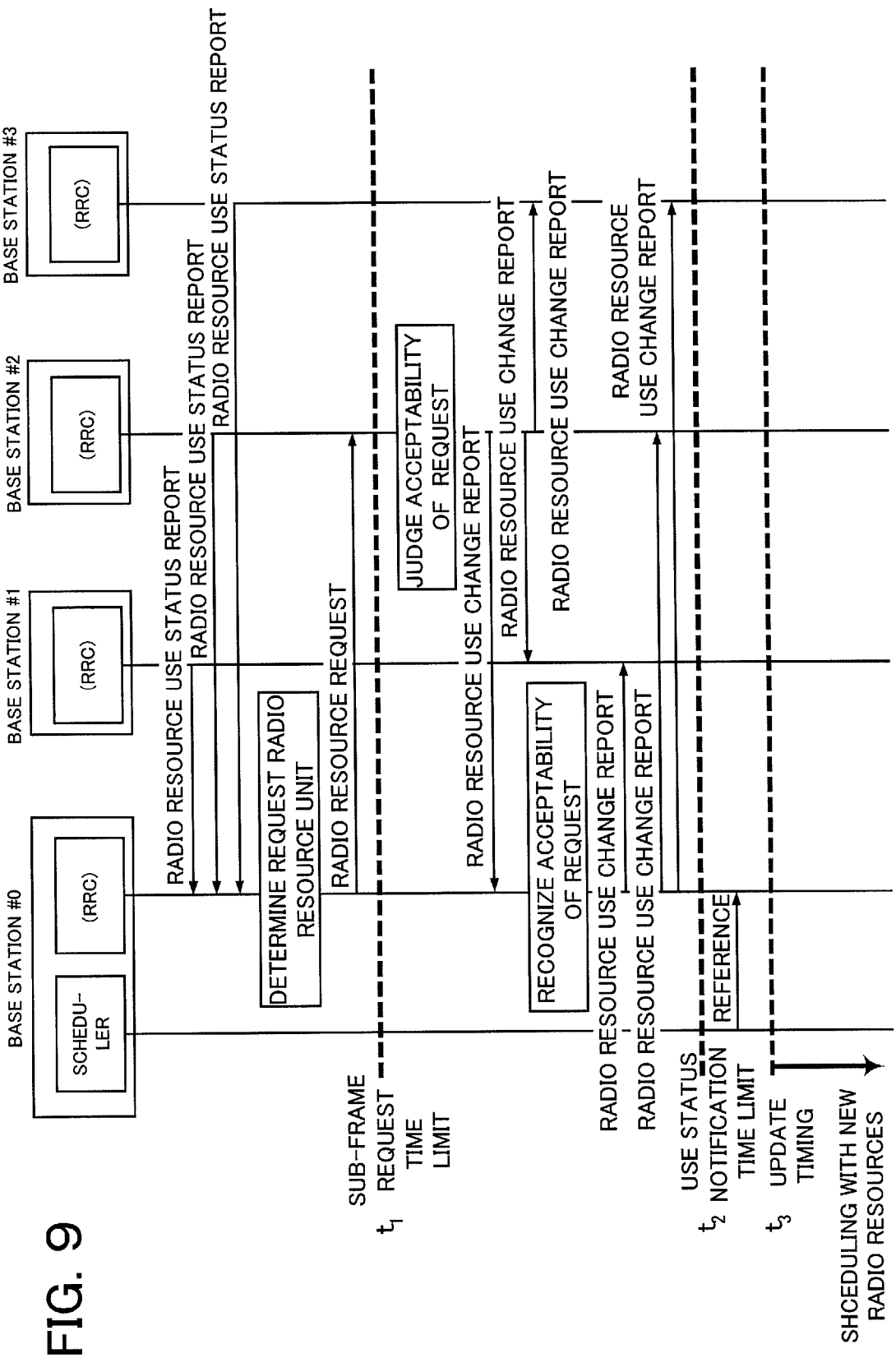
FIG. 9 is a sequence diagram illustrating an example of procedures of dynamically changing radio resource allocation.
Figure 11:
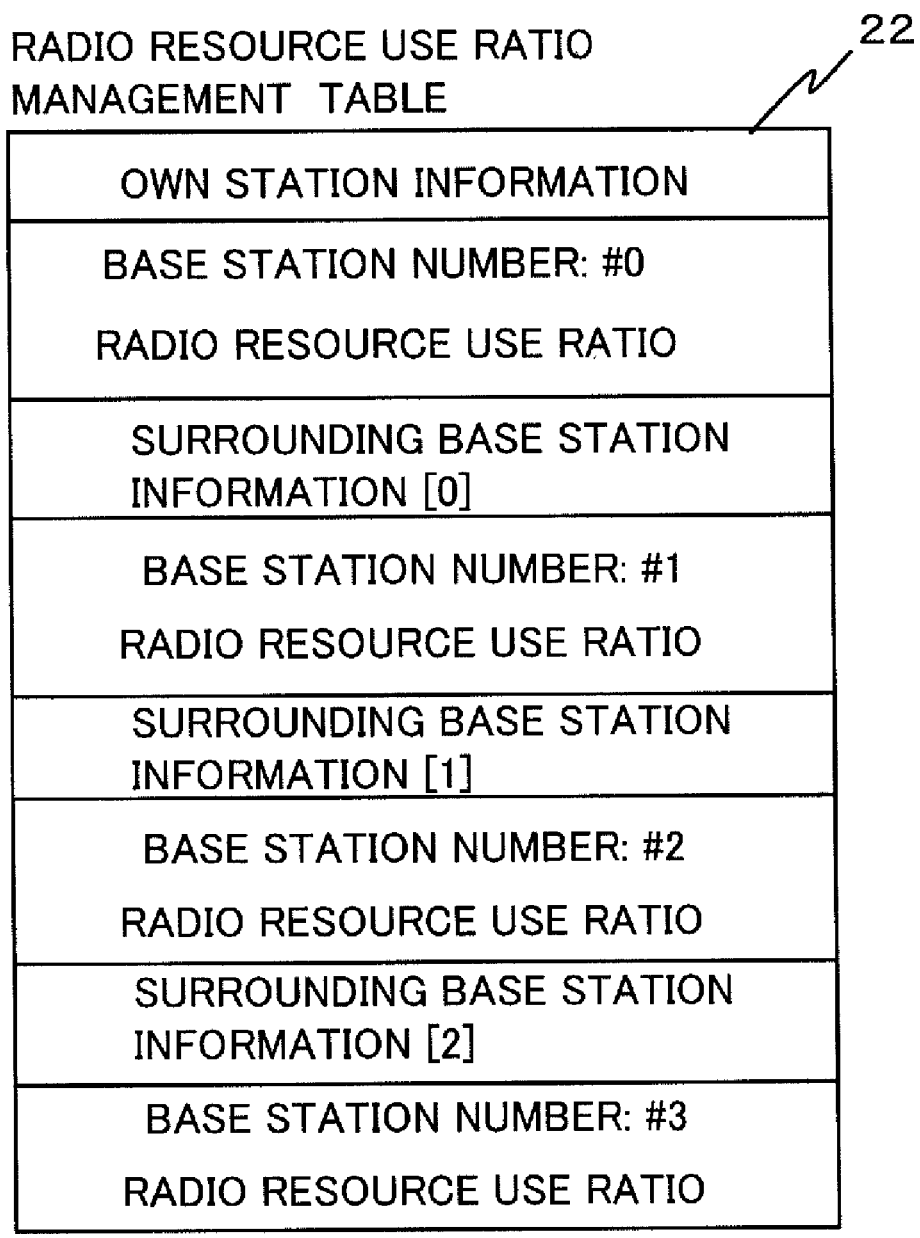
FIG. 11 is a diagram illustrating an example of a radio resource use ratio management table managed by the radio resource controller (RRC)
Figure 12:
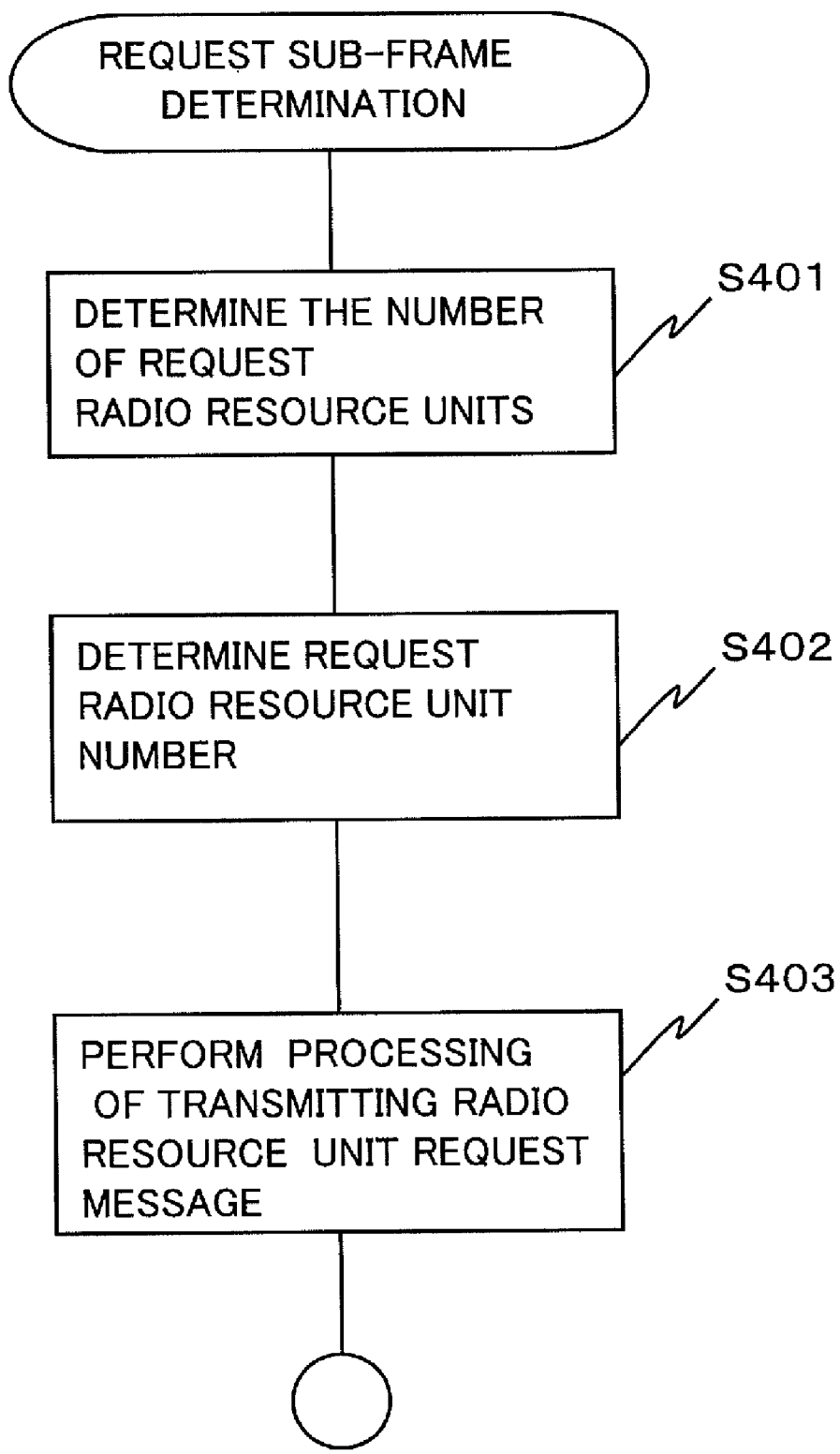
FIG. 12 is a flow chart illustrating an example of request sub-frame determining processing illustrated in FIG. 9.
Figure 13:
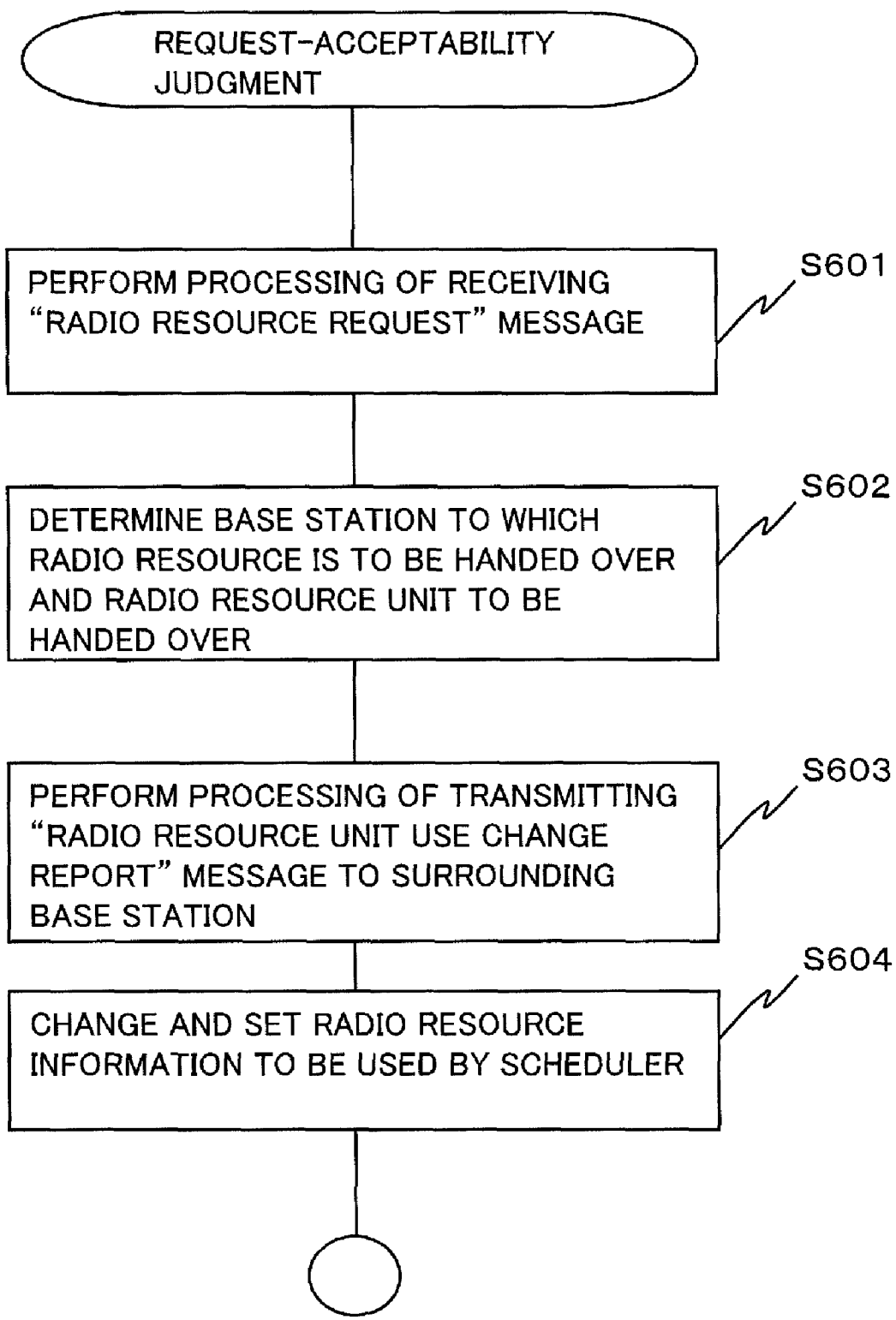
FIG. 13 is a flow chart illustrating an example of request-acceptability judging processing illustrated in FIG. 9.
Figure 14:
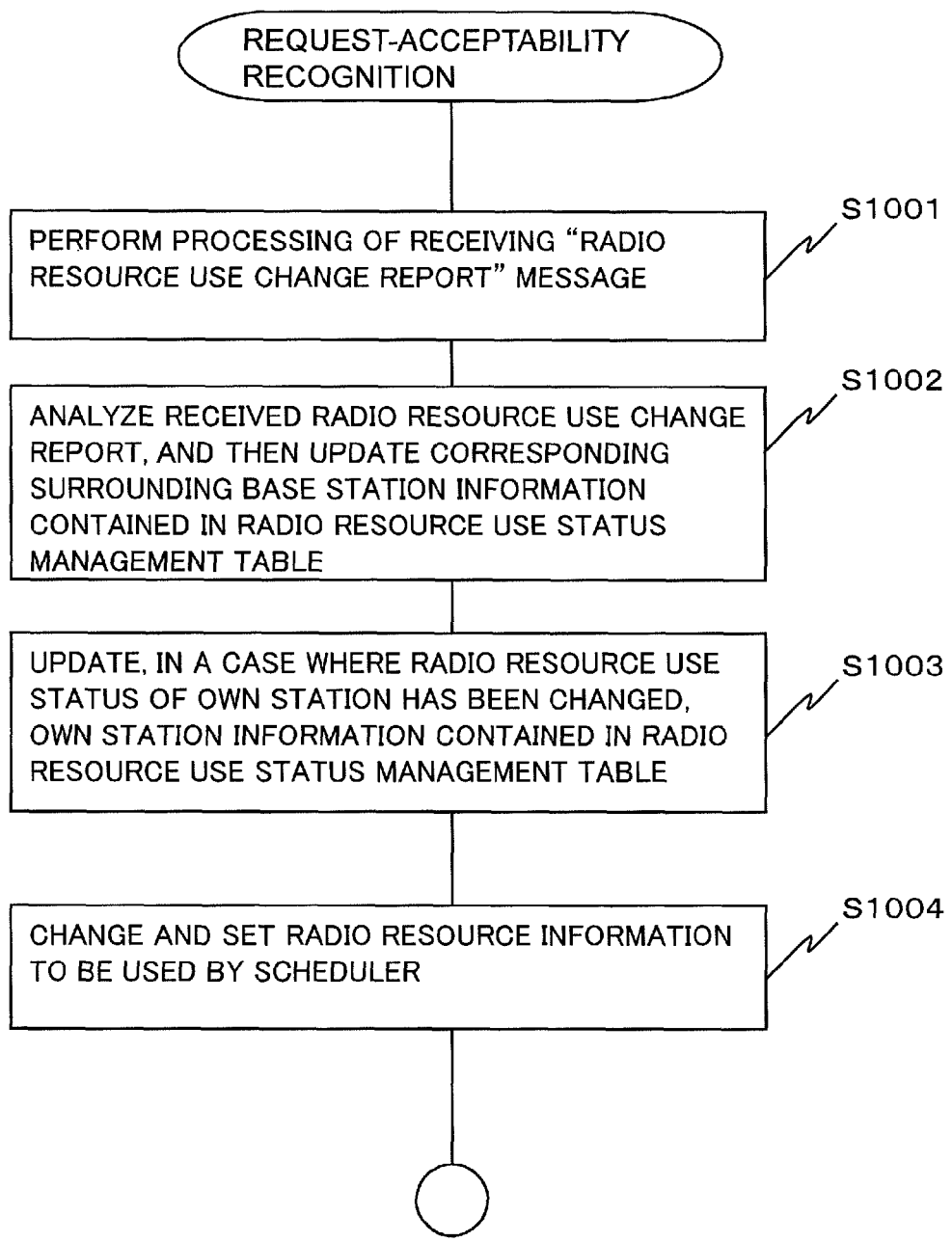
FIG. 14 is a flow chart illustrating an example of request-acceptability recognizing processing illustrated in FIG. 9.

Next, description is made of procedures of changing the radio resource unit allocation. FIG. 9 is a sequence diagram illustrating an example of the procedures of changing the allocation. FIG. 10 is a diagram illustrating an example of a radio resource use status management table provided to the radio resource controller (RRC). FIG. 11 is a diagram illustrating an example of a radio resource use ratio management table provided to the radio resource controller (RRC). FIG. 12 is a flow chart illustrating request radio resource unit determining processing. FIG. 13 is a flow chart illustrating request-acceptability judging processing. FIG. 14 is a flow chart illustrating request-acceptability recognizing processing. FIG. 15 is a diagram illustrating a format example of a radio resource use status report message. FIG. 16 is a diagram illustrating a format example of a radio resource request message. FIG. 17 is a diagram illustrating a format example of a radio resource use change report message and a radio resource use change notification.

In the example illustrated in FIG. 9, the dynamic allocation control of the radio resources is applied to the base stations (radio base stations) #0 to #3 serving as the radio stations. The base stations #0 to #3 are in relation of sharing the radio resources to be used in the wireless communication. Further, it is assumed that the base stations #0 to #3 each have the configuration of the base station #1 illustrated in FIG. 8, and also have cells (communication areas) located adjacent to each other, and that the base stations #0 to #3 periodically change (update) the allocation status (resource distribution) by using such a frame set as illustrated in FIG. 4. Further, it is assumed that, in the initial state, the radio resource units are allocated to the base stations #0 to #3 in proportion to the usage of the radio resources at each base station.

In the example illustrated in FIG. 9, the allocation state of the radio resources is changed according to the following rules.

<1> The change of the radio resource unit allocation is performed by handing over a radio resource unit that is being used by a base station located adjacent thereto.

<2> In a case where a plurality of handover requests for a radio resource unit are received, the radio resource unit is handed over to a base station in which a radio resource shortage is more serious.

Detailed description is made of specific procedures of changing the allocation with reference to the following [1] to [4].

[1] Collection of Information on Requests for Radio Frames to be Allocated

Referring to FIG. 9, the base station #0 carries out collecting information for determining a request radio resource unit to be allocated to the base station #0.

The RRC 14 of the base station #0 periodically collects, at fixed time points, capacity information of the surrounding base stations #1 to #3 (including base station #0 itself (own station)) through reception of the radio resource use status report message (FIG. 15), which is one of the inter-RRC messages (FIG. 9: S1, S2, and S3).

The capacity information indicates a radio resource congestion level. With the provision of the congestion level in accordance with the radio resource use ratio of the base station, it is intended to prevent the radio resource allocation control from being changed frequently due to small changes in radio resource use ratio.

The radio resource use status report message is a message for reporting the radio resource use ratio of the own station to the RRC 14 of the surrounding base station. The radio resource use status report message is periodically transmitted. The radio resource use status report message contains, as parameters, an own station number (base station identifier) and a radio resource use ratio of the own station (see FIG. 15).

The radio resource use ratio represents a ratio of the radio resources, which have been actually used to transmit radio waves after being allocated with transmission data by the scheduler of the base station, with respect to the amount of the radio resources allocated through the radio resource allocation control (in the embodiment of the present invention, the number of radio resource units×the amount of radio resources per radio resource unit). The radio resource use ratio is normally expressed in percentage.

Here, the RRC 14 manages a radio resource use status management table 21 (FIG. 10) and a radio resource use ratio management table 22 (FIG. 11), which are stored in a storage device provided inside the base station.

As illustrated in FIG. 10, the radio resource use status management table 21 has a storage area for own station information and storage areas for surrounding base stations (FIG. 10 exemplifies the table 21 of the base station #0). In each of the storage areas, with regard to the own station or the surrounding base station, a base station number, the number of currently-allocated radio resource units, and a currently-allocated radio resource unit number are stored.

Further, as illustrated in FIG. 11, the radio resource use ratio management table 22 has a storage area for the own station information and storage areas for the surrounding base station information (FIG. 11 exemplifies the table 22 of the base station #0). In each of the storage areas, the base station number and the radio resource use ratio of the own station or the surrounding base station are stored.

Upon reception of the radio resource use status report message, the RRC 14 extracts the base station number and the radio resource use ratio contained in the message, which are then stored in the corresponding storage areas in the radio resource use ratio management table 22.

The radio resource use ratio and the radio resource congestion level (capacity information) are associated with each other in advance, and hence the RRC 14 can determine the radio resource congestion level (capacity information) based on the radio resource use ratio.

It should be noted that the radio resource use status report message is transmitted from each of the base stations #0 to #3 to all of the surrounding base stations, and that the base stations #0 to #3 are configured to have the storage contents of each of the tables 21 and 22 thereof and the capacity information thereof synchronized thereamong.

Next, the RRC 14 of the base station #0 determines a request radio resource unit based on the capacity information (radio resource congestion level) collected from the own base station and the surrounding base stations (FIG. 9: S4).

A determining algorithm is as follows (FIG. 12: request sub-frame determination). It should be noted that, in accordance with the number of request radio resource units of the own base station, a handover of a radio resource may be requested of a plurality of surrounding base stations. In addition, in accordance with a gap in congestion level or a congestion risk (how high the congestion level is), it is also possible to make a request for a plurality of radio resource units to one or more surrounding base stations.

First, the RRC 14 determines the number of request radio resource units (FIG. 12: S401). Specifically, in accordance with the radio resource congestion levels of the respective base stations, the RRC 14 determines the number of radio resource units which the own base station is to request to be handed over from the surrounding base stations. On this occasion, when the radio resource congestion level of the own base station is the lowest of the surrounding base stations including the own base station, the RRC 14 does not request for a radio resource unit.

Next, the RRC 14 determines a request radio resource unit number (FIG. 12: S402). Specifically, the RRC determines, as the radio resource unit number for which a handover request is to be made, a radio resource unit number used by (allocated to) a surrounding base station with the lowest capacity (radio resource congestion level).

Here, in a case where radio resource units are selected from a plurality of sub-channel groups during a given radio frame time, it is necessary to select one or more radio resource units having an even number, to which a sub-channel group containing the FCH is applied.

[2] Processing of Transmitting Radio Resource Unit Request Message

After the request radio resource unit number is determined, the RRC 14 performs processing of transmitting a radio resource unit request message (radio resource request) (FIG. 12: S403).

Specifically, the RRC 14 identifies, from the radio resource use status management table 21, a base station that is using the radio resource unit having the radio resource unit number determined in Step S402, and then transmits a radio resource unit request message (radio resource request) to the RRC 14 managing the radio resource unit inside the identified base station.

The radio resource request is one of the inter-RRC messages, which requests a handover of a radio resource unit of the RRC 14 of a request destination base station. As illustrated in FIG. 16, the radio resource request contains the own base station number, the number of request radio resource units, and the request radio resource unit number as parameters. It should be noted that the RRC 14 transmits the radio resource request before a periodical fixed time elapses (sub-frame request time limit t1).

Here, each of the base stations #1 to #3 performs the processing of Steps S401 and S402 before the sub-frame request time limit t1 comes, and, if necessary, may transmit the radio resource request to one or more other base stations.

In the example illustrated in FIG. 9, only the RRC 14 of the base station #0 determines to request the handover (allocation change) of the radio resource unit that is being used by the base station #2, and transmits the radio resource request to the base station #2 (FIG. 9: S5).

[3] Radio Resource Unit Allocation Judgment

The RRC 14 of the base station (base station #2) that has received the radio resource request from the surrounding base station (base station #0) judges whether or not the handover of the request radio resource unit is possible in the following manner (FIG. 9: S6).

Specifically, the RRC 14 performs processing of receiving the radio resource request (FIG. 13: S601).

Next, the RRC 14 determines a handover destination base station of the radio resource and the radio resource unit to be handed over based on the radio resource request (FIG. 13: S602). In a case where a single radio resource request is received, the RRC 14 accepts the handover of the radio resource unit specified by the radio resource request.

On the other hand, in a case where the radio resource requests are received from a plurality of surrounding base stations, the RRC 14 accepts a request from a surrounding base station with a high radio resource use ratio. Here, in a case where the congestion levels (radio resource use ratios) of the plurality of surrounding base stations are identical, the RRC 14 randomly determines to perform the handover on one of the plurality of surrounding base stations. Meanwhile, in a case where the own base station has transmitted the radio resource request, the RRC 14 does not accept the handover.

In the example illustrated in FIG. 9, the base station #2 accepts the radio resource request from the base station #0.

[4] Radio Resource Unit Use Change Report

The base station (base station #2) that has received the radio resource request creates and transmits a radio resource unit use change report message (radio resource use change report: FIG. 17) based on a result of the judgment made in Step S6(S602), thereby notifying all of the surrounding base stations (base stations #0, #1, and #3) that the radio resource unit use status of the own station has been changed (FIG. 9: S7, S8, and S9).

In other words, the RRC 14 performs processing of transmitting the radio resource use change report (FIG. 13: S603). Specifically, in a case where the RRC 14 determines to accept the handover request, the RRC 14 performs update processing of deleting information associated with the radio resource unit to be handed over from the storage area of the own station information of the radio resource use status management table 21 (FIG. 10), and then creates and transmits the radio resource use change report containing the contents of the updated storage area.

Here, the radio resource use change report is one of the inter-RRC messages, which is used by the RRC 14 of the base station that has received the radio resource request to notify the RRCs 14 of the surrounding base stations that the radio resource unit use status of the own station has been changed. As illustrated in FIG. 17, the radio resource use change report contains, as parameters, the own base station number, the number of radio resource units used by the own station, and the radio resource unit number used by the own station.

Here, in the case where the RRC 14 does not accept the request, the storage contents of the management table 21 are not updated, and the radio resource unit number for which the handover request has been made is contained in the radio resource use change report in that case.

Upon reception of the radio resource use change report, the base station (base station #0) that has transmitted the radio resource request performs the request-acceptability recognizing processing (FIG. 9: S10).

Specifically, the RRC 14 performs the processing of receiving the radio resource use change report (FIG. 14: S1001). Next, the RRC 14 analyzes the radio resource use change report, thereby judging whether or not the radio resource request is acceptable.

At that time, the RRC 14 judges whether or not the radio resource unit number for which the handover request has been made is contained in the radio resource use change report. Then, when the radio resource unit number is not contained, the RRC 14 judges that the request has been accepted. When the radio resource unit number is contained, the RRC 14 judges that the request has been rejected.

In the case where it is judged that the request has been accepted, in accordance with the parameters contained in the radio resource use change report message, the RRC 14 updates the storage area of the surrounding base station corresponding to the base station #2 in the management table 21 (FIG. 14: S1002) Specifically, the radio resource unit number of the handover target is deleted from the corresponding storage area, and, at the same time, the number of deleted radio resource unit numbers is subtracted from the number of radio resource units.

Subsequently, the RRC 14 registers the radio resource unit number for which the handover request has been made in the storage area of the own station information of the management table 21, and also increases the number of radio resource units (FIG. 14: S1003). In this manner, the radio resource unit use status of the base station #0 is changed.

After the above-mentioned update of the management table 21 is finished, the RRC 14 creates a radio resource unit use change notification message (radio resource use change notification) of the own station and transmits the radio resource unit use change notification message (FIG. 9: S11, S12, and S13).

Here, the radio resource use change notification is one of the inter-RRC messages, which is used by the RRC 14 of the base station (base station #0) that has received the radio resource use change report to notify the RRCs 14 of all the surrounding base stations that the use status of the radio resource units of the own station has been changed in accordance with a result of the report. The radio resource use status notification has the same format as that of the radio resource use status report (see FIG. 17).

Each of the surrounding base stations (base stations #1, #2, and #3) that have received the radio resource use change notification uses the parameters contained in the notification to thereby update the storage area associated with the base station #0 within the management table 21.

Here, each of the base stations #0 to #3 performs the processing such that transmission/reception of the radio resource use status notification is finished by the time at which a given use status notification time limit t2 comes after expiration of the sub-frame request time limit t1.

Here, in the case where the radio resource request has been rejected, the RRC 14 of the request source does not update the radio resource unit use status of the own station or transmit the radio resource use change notification. It should be noted that, in a case where the use status of a certain surrounding base station is changed in the received radio resource use status report, the RRC 14 performs processing of updating the management table 21 in accordance with the changed contents.

When the use status notification time limit t2 has come, the scheduler 15 of the base station #0 refers to the own station information contained in the management table 21, and performs, at a given update timing t3, update (change) and setting of the radio resource information to be used by the scheduler 15 itself. Then, according to the scheduling based on new radio resources, the scheduler 15 of the base station #0 enables the transmission data to be transmitted from the own station with the use of the radio resource units allocated to the own station (FIG. 14: S1004).

Such processing of updating the schedule as described above is also executed by the scheduler 15 of the base station (base station #2) that has handed over the radio resource unit in response to the request (FIG. 13: S604).

It should be noted that, in the example illustrated in FIG. 9, the intervals of the sub-frame request time limit t1, the use status notification time limit t2, and the update timing t3 are fixed, and that the sub-frame request time limit t1 is further configured to come periodically after the provision of the frame set (FIG. 4) is repeated a given number of times.

<Effects of Embodiment>

The following can be pointed out as the effects of the embodiment of the present invention described above.

[1] Efficient radio resource operation can be realized in the case of the reuse factor of 1 (cell site design for repeating the same frequency).

[2] A maximum throughput can be constantly realized in a system as a whole by dynamically changing the resource distribution among the base stations.

[3] Owing to the resource distribution performed in units of the radio resource units, there is no need to synchronize the structures of the radio frames with one another among the base stations.

[4] As a result of the above-mentioned item [3], it is possible to change the adoption of a DL/UL ratio and a plurality of antennas (MIMO, diversity, AAS, etc.) from base station to base station.

[5] Owing to the fact that the sub-channels are not divided into small segments, it is easy to take measures against the partial fading, which do not affect frequency characteristics.

[6] The present invention can be used while satisfying the radio frame format of the specifications standardized by WiMAX (IEEE 802.16e).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio resource allocation method of allocating common radio resources shared among a plurality of radio stations or a plurality of sectors to each of the plurality of radio stations or each of the plurality of sectors, comprising:

defining, as a frame set, a given number of radio frames for repeatedly providing the common radio resources along a time axis;

defining, as radio resource units, minimum units obtained by dividing the common radio resources provided by the frame set in units of the radio frames and in units of sub-channel groups; and allocating at least one of the radio resource units to each of the plurality of radio stations or the each of the plurality of sectors.

2. A radio resource allocation method according to claim 1, further comprising determining, in accordance with a usage of radio resources at the each of the plurality of radio stations or the each of the plurality of sectors, a number of the radio resource units to be allocated to the each of the plurality of radio stations or the each of the plurality of sectors.

3. A radio resource allocation method according to claim 1, further comprising changing, in accordance with a use ratio of the radio resources at the each of the plurality of radio stations or the each of the plurality of sectors, an allocation status of the radio resource units with respect to the each of the plurality of radio stations or the each of the plurality of sectors.

4. A radio resource allocation method according to claim 1, further comprising changing the allocation status of the radio resource units by handing over, to one of the plurality of radio stations or one of the plurality of sectors that requires increase in radio resource, one or more radio resource units that are being used by another one of the plurality of radio stations or another one of the plurality of sectors.

5. A radio resource allocation method according to claim 4, further comprising handing over, in a case where a handover request is made from a plurality of other radio stations with respect to a radio resource unit that is being used by the one of the plurality of radio stations, the radio resource unit, for which the handover request is made, to one of the plurality of other radio stations, in which a radio resource shortage is most serious.

6. A radio station that performs wireless communication by using some or all of common radio resources shared among a plurality of radio stations or a plurality of sectors, comprising:
 a radio resource controller to determine, as a radio resource to be used by an own station, at least one of radio resource units serving as minimum units obtained by dividing, in units of radio frames and in units of subchannel groups, the common radio resources provided by a frame set including a given plurality of the radio frames that are repeatedly provided along a time axis; and
 a scheduler to schedule the wireless communication in accordance with the determined at least one of the radio resource units.

7. A radio station according to claim 6, wherein the radio resource control dynamically changes a number of the radio resource units to be used by the own station in accordance with a usage of the radio resources of the own station.

8. A radio station according to claim 6, wherein the radio resource controller dynamically changes the number of the radio resource units to be used by the own station based on a use ratio concerning one or more radio resource units that are being used by each of the plurality of radio stations.

9. A radio station according to claim 6, wherein:
 the radio resource controller requests another one of the plurality of radio stations to hand over a radio resource unit that is being used by the another one of the plurality of radio stations in a case of increasing the number of the radio resource units to be used by the own station, and determines, when the another one of the plurality of radio stations permits the handover of the radio resource unit, to use the handed-over radio resource unit; and
 the scheduler performs schedule change so that the own station performs the wireless communication by using the handed-over radio resource unit.

10. A radio station according to claim 6, wherein:
 the radio resource controller permits, when a handover request for the radio resource unit that is being used by the own station is received from a plurality of other radio stations, the handover of the radio resource unit to one of the plurality of other radio stations, in which a radio resource shortage is most serious, and determines to suspend using the radio resource unit for which the handover is permitted; and
 the scheduler performs the schedule change so that the wireless communication is not performed by using the radio resource unit for which the handover is permitted.
 over the higher priority class logical channel, the allocation of a radio resource for SR transmission is stopped.

\* \* \* \* \*